United States Patent
Park

(10) Patent No.: US 7,671,904 B2
(45) Date of Patent: Mar. 2, 2010

(54) APPARATUS AND METHOD FOR CAPTURING IMAGES

(75) Inventor: Chan-ju Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 426 days.

(21) Appl. No.: 11/653,396

(22) Filed: Jan. 16, 2007

(65) Prior Publication Data

US 2007/0182745 A1   Aug. 9, 2007

(30) Foreign Application Priority Data

Feb. 8, 2006   (KR) .................. 10-2006-0012092

(51) Int. Cl.
  *H04N 5/76*   (2006.01)
(52) U.S. Cl. .............. 348/231.3; 348/231.99; 348/231.1; 348/231.2; 348/231.9
(58) Field of Classification Search ..  348/231.99–231.9; 396/310–321; 711/100–173
See application file for complete search history.

(56) References Cited

U.S. PATENT DOCUMENTS

| | | | | |
|---|---|---|---|---|
| 7,098,947 B2* | 8/2006 | Iwauchi | ............... | 348/231.1 |
| 7,116,361 B2* | 10/2006 | Baron | ............... | 348/231.1 |
| 7,375,742 B2* | 5/2008 | Aizawa | ............... | 348/207.1 |
| 7,432,963 B2* | 10/2008 | Chosa | ............... | 348/231.1 |
| 2001/0012064 A1* | 8/2001 | Kubo | ............... | 348/231 |
| 2003/0142950 A1 | 7/2003 | Um et al. | | |
| 2005/0237399 A1* | 10/2005 | Endo | ............... | 348/231.99 |
| 2006/0152599 A1 | 7/2006 | Yokonuma et al. | | |

FOREIGN PATENT DOCUMENTS

| | | |
|---|---|---|
| CN | 1435835 A | 8/2003 |
| CN | 1625897 A | 6/2005 |
| JP | 2001-128107 A | 5/2001 |
| JP | 2002-237977 A | 8/2002 |
| KR | 10-2004-0076615 A | 9/2004 |
| KR | 10-2004-0077499 A | 9/2004 |
| KR | 1020060037547 A | 5/2006 |

* cited by examiner

*Primary Examiner*—Jason Chan
*Assistant Examiner*—Pritham Prabhakher
(74) *Attorney, Agent, or Firm*—Sughrue Mion, PLLC

(57) ABSTRACT

An apparatus for capturing images is provided. The apparatus for capturing images includes a control unit that determines whether an internal memory is available for use, and a process-driving unit that loads background processes.

10 Claims, 6 Drawing Sheets

APPARATUS AND METHOD FOR CAPTURING IMAGES

CROSS-REFERENCE TO RELATED APPLICATION

This application claims priority from Korean Patent Application No. 10-2006-0012092 filed on Feb. 8, 2006 in the Korean Intellectual Property Office, the disclosure of which is incorporated herein in its entirety by reference.

BACKGROUND OF THE INVENTION

1. Field of the Invention

The present invention relates to a method of and apparatus for capturing images, and more particularly, to a method of and apparatus for capturing images, in which an initialization process is executed by a processor as a background operation and the apparatus is immediately operated using an internal memory.

2. Description of the Related Art

Recently, digital still cameras (DSCs) have become popular, supplanting conventional film cameras. In addition to single lens reflex (SLR) cameras for professionals, cameras for other types of users are being manufactured. Specifically, ultra-compact cameras that are easy to carry and can quickly capture images when needed are becoming popular with users due to their stylish designs, high performance, and small size.

Digital cameras use memory chips instead of film to capture images, and may control the number of capturable images or give different intensity to pictures. In addition, the digital cameras display images by generating electrical signals according to the brightness of the scene via a charged coupled device (CCD), and control analog digital converter (ADC) chipsets or JPEG chipsets via a central processing unit (CPU) chipset.

The JPEG chipset compresses digital signals converted in the ADC chipset that receives data from the CCD, and stores them in .jpg file in an external memory. JPG is a standard compression technique for efficiently adjusting the size of the image file while maintaining nearly the same picture quality as the original. The image processed in the JPEG chipset is 2 to 4 MB, and is stored in a flash memory.

The digital cameras have information on the date the image was captured, an index, and data for a monitor in JPEG-image data. The exchangeable image file (Exif), digital print order format (DPOF), PictBridge, camera image file format (CIFF), and design rule for camera file system (DCF) are file formats used by most digital cameras. DPOF stores image output information in a memory card MISC folder, selects images that will be output using the information, and determines the number of copies of the images.

Generally, DCF contains information on the structure of a directory, the name of a file, the structure of the file, thumbnails, and screen nail images. In addition, when determining the name of an image data (file), DCF reads information on images stored in an external memory before storing it therein, and names the file afterwards.

In order to record captured images, the digital cameras use an external memory such as a multimedia card (MMC), a smart media (SM) card, a compact flash (CF), or a memory stick.

When a user turns the power on, the digital camera reads management information of the external memory, which stores information on available memory, determines whether there is enough memory to capture more images, and computes the number of images the digital camera can capture according to the available memory.

In addition, the read management information is recorded in a memory, e.g., a main CPU cache or a main CPU memory in the digital camera.

FIG. 1 is a flow chart illustrating the initialization process of a conventional digital camera.

When a system is booted, a digital camera executes an initialization.

First, a CPU memory, (e.g., SRAM), a universal asynchronous receiver transmitter (UART), and a flash are initialized S11.

Then, a CCD, an image-processing unit, and digital camera hardware are initialized S21, S31, S41. For example, an image-processing DSP, a motor, a video bus, a USD device, an LCD, and a button are initialized. The initialization processes may be performed during the initialization of an OS or in a different order depending on the system, and the OS may initialize hardware.

Once the basic initialization process of the system has been completed, an external memory (e.g., a memory card) is initialized in order to store captured image data S51.

The initialization of the external memory will be described in detail with reference to FIG. 2.

Once the initialization process of the external memory has been completed, an image is captured, DCF information (list) is renewed, and the captured image is stored in the external memory S61 and S71. Generally, the DCF format contains information on the structure of a directory, the name and structure of a file, thumbnails, and screen nail images. In addition, when determining the name of an image file, the DCF reads information on images stored an external memory before storing it therein, and names file afterwards. The aforementioned steps may be sequentially or concurrently executed. In some cases, the process may be executed in a different order.

FIG. 2 is a flow chart illustrating the initialization process of the external memory in FIG. 1.

First, the initialization process is initiated, and the mounting process is carried out in order to access to a file system of an external memory S53.

In addition, available memory space and the number of images that can be captured are determined S55.

Next, when storing captured image data, information on existing image data, which is stored in the external memory, is read in order to name the file S57. Here, "DCF" may be used as a part of the filename, and the file (image data) may be managed using DCF information.

Then, the file is named via the read information, and the DCF information is renewed. The aforementioned steps may be sequentially or concurrently executed. In some cases, the process may be executed in a different order.

A digital camera should take the least amount of time to boot so that a user can capture images quickly. However, as described with reference to FIGS. 1 and 2, the initialization process requires a significant amount of time, and thus hinders immediate use of the camera.

Japanese Unexamined Patent Application No. 2001-128107 discloses a digital camera that stores captured data (image data) in a temporary memory, determines whether a removable recording medium (e.g., a memory card) can be used, and records the captured data in the temporary memory of the removable recording medium.

However, the invention does not disclose information on steps the camera executes to determine whether the removable recording medium can be used while storing the captured data in the memory, and the aforementioned steps have a significant impact on the initialization of the system. Accordingly, a solution to the aforementioned problems is required.

In addition, even though the initialization is executed in a basic system and an image-processing device, a time lag still exists in initializing an external memory, mounting files, or renewing DCF information, resulting in degradation of system initialization, which is a problem.

SUMMARY OF THE INVENTION

In view of the above, it is an aspect of the present invention to capture images.

Features and advantages of the present invention will become clear to those skilled in the art upon review of the following description, attached drawings and appended claims.

According to an aspect of the present invention, there is provided an apparatus for capturing images, the apparatus including a control unit that determines whether an internal memory is available for use, and a process-driving unit that loads background processes.

According to another aspect of the present invention, there is provided an apparatus for capturing images, the apparatus including determining whether an internal memory is available for use, and loading background processes when the internal memory is available.

BRIEF DESCRIPTION OF THE DRAWINGS

The above and other features and advantages of the present invention will become more apparent by describing in detail preferred embodiments thereof with reference to the attached drawings, in which.

DETAILED DESCRIPTION OF THE EXEMPLARY EMBODIMENTS OF THE INVENTION

Figure 1:
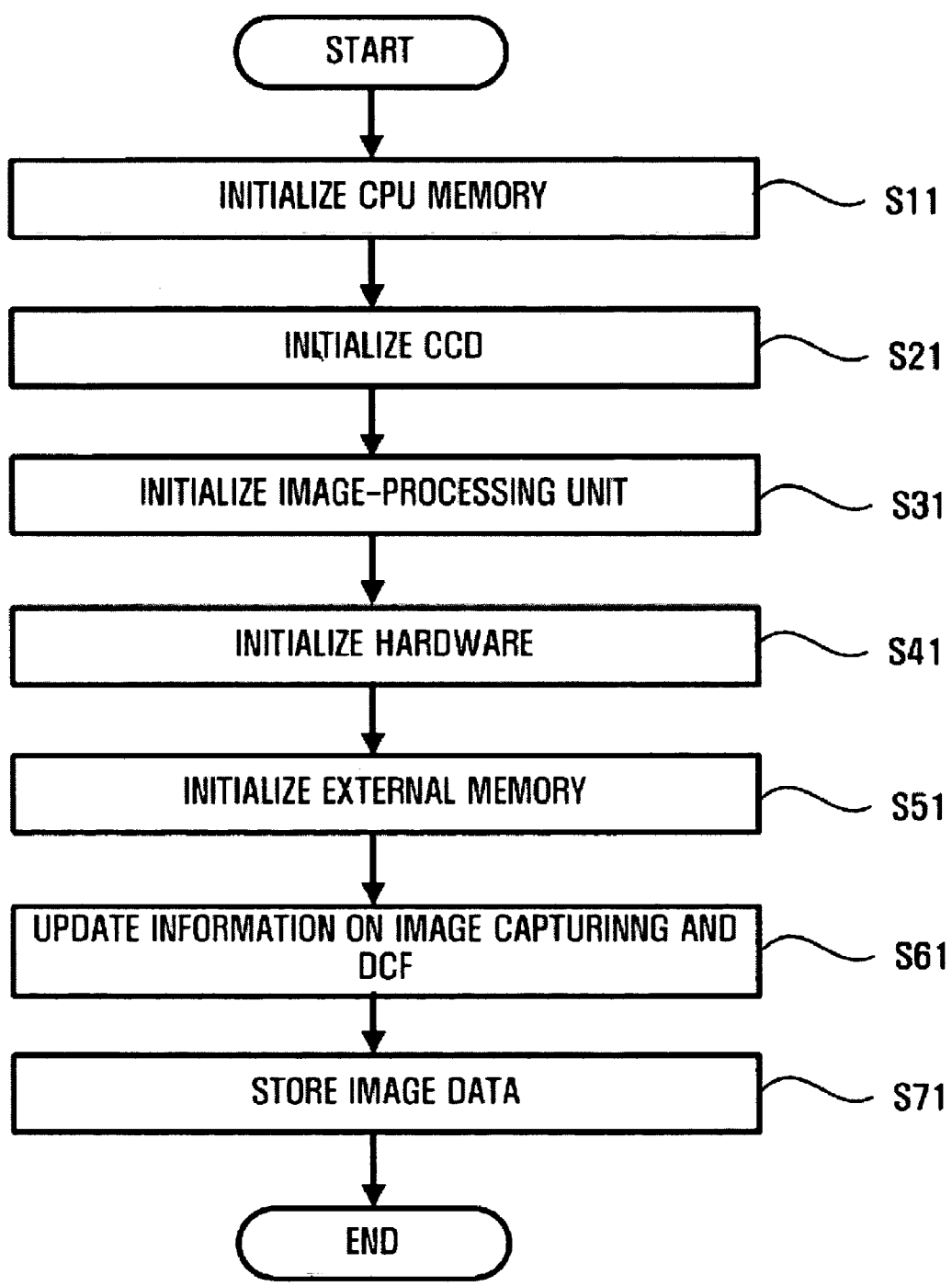
FIG. 1 is a flow chart illustrating an initialization process of a conventional digital camera.

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to exemplary embodiments of the invention.

Figure 3:
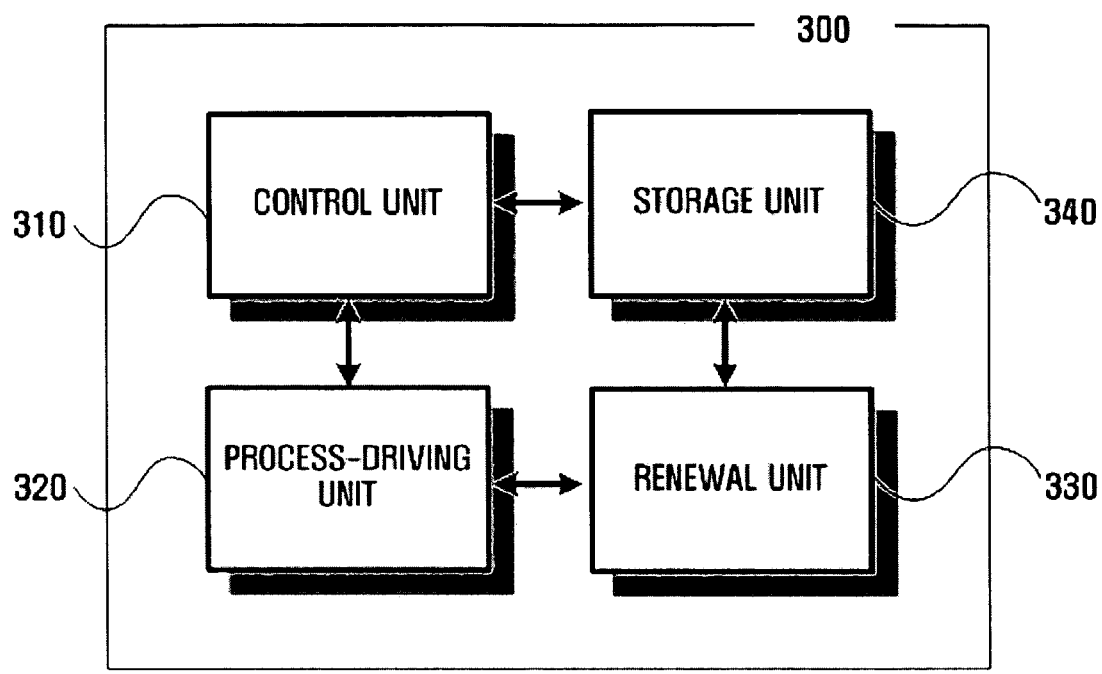
FIG. 3 is a block diagram illustrating a camera.

FIG. 3 is a block diagram illustrating a camera.

A camera 300 includes a control unit 310, a process-driving unit 320, a renewal unit 330, and a storage unit 340.

The control unit 310 determines whether an internal memory (e.g., a RAM or a flash memory), stores image data therein, and determines whether the external memory has been initialized before the next shooting operation. For example, when capturing images, a user sets a specific internal memory (e.g., RAM) and stores the captured images using the internal memory. But, if the user does not set a specific internal memory, the control unit 310 checks whether the RAM or flash memory can be used, and stores image data by selected available internal memory.

The process-driving unit 320 drives a background process when the internal memory is available for use. The background process executes an initialization process as a background operation. The detailed information thereon will be described with reference to FIG. 5.

The renewal unit 330 renews DCF information. The renewal may be executed as a background operation by the background process, and may be executed when images temporarily stored in the internal memory are stored in the external memory, or when the images are directly stored in the external memory without using the internal memory. In addition, image data is named or information renewal on thumbnails and screen nails is executed via DCF information renewal. Here, the screen nail is the image data which has been resized to fit the current screen in order to output the captured image on the screen, and the thumbnail is the image data that may be viewed in window-based an image viewer. As a DCF-related document, "Design Rule for Camera File System DCF Version 2.0" may be referred to.

The storage unit 340 includes the internal memory (e.g., a RAM or a flash memory) and the external memory, and encodes and stores image data in jpg by a JPEG chipset. In this case, when the internal memory is available for use, the image data is stored in the internal memory. When the initialization of the external memory is complete, the image data stored in the internal memory is backed up (stored) in the external memory. The image data (file) stored in the internal or external memory is named based on DCF and may be managed as DCF information.

The term "module" means, but is not limited to, a software or hardware component, such as a Field Programmable Gate Array (FPGA) or an Application Specific Integrated Circuit (ASIC), which executes certain tasks. A module may advantageously be configured to reside in the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 4:
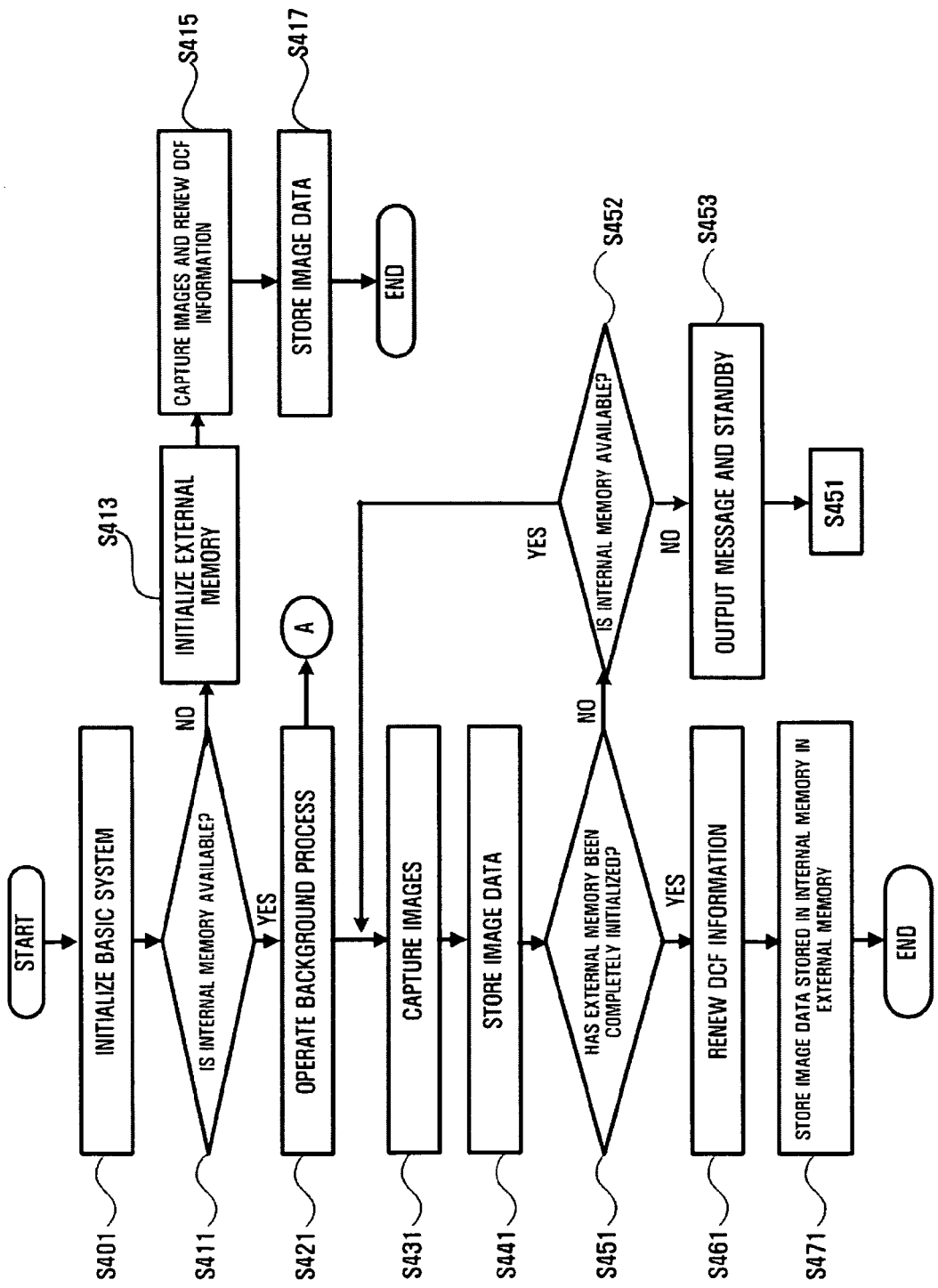
FIG. 4 is a flow chart illustrating a process of shooting in a camera according to an exemplary embodiment of the present invention.

FIG. 4 is a flow chart illustrating a process of shooting in a camera according to an exemplary embodiment of the present invention.

When a system is cold booted, a digital camera executes a basic system initialization S401, e.g., a CPU, a memory, a CCD, an image-processing unit, and hardware. These steps correspond to steps S11 or S41 of FIG. 1 in the prior art.

In a conventional system, the basic system initialization is followed by an external memory initialization, whereas in the present invention, the basic system initialization is executed, and it is determined whether an internal memory (a RAM or a flash memory) is available for use by a control unit 310 S411.

In this case, if a user sets a specific internal memory (e.g., a RAM), captured images are stored using the set internal memory. But if the user does not set a specific internal memory, the control unit 310 determines whether RAM or flash memory is available, selects available internal memory, and stores image data.

Figure 2:
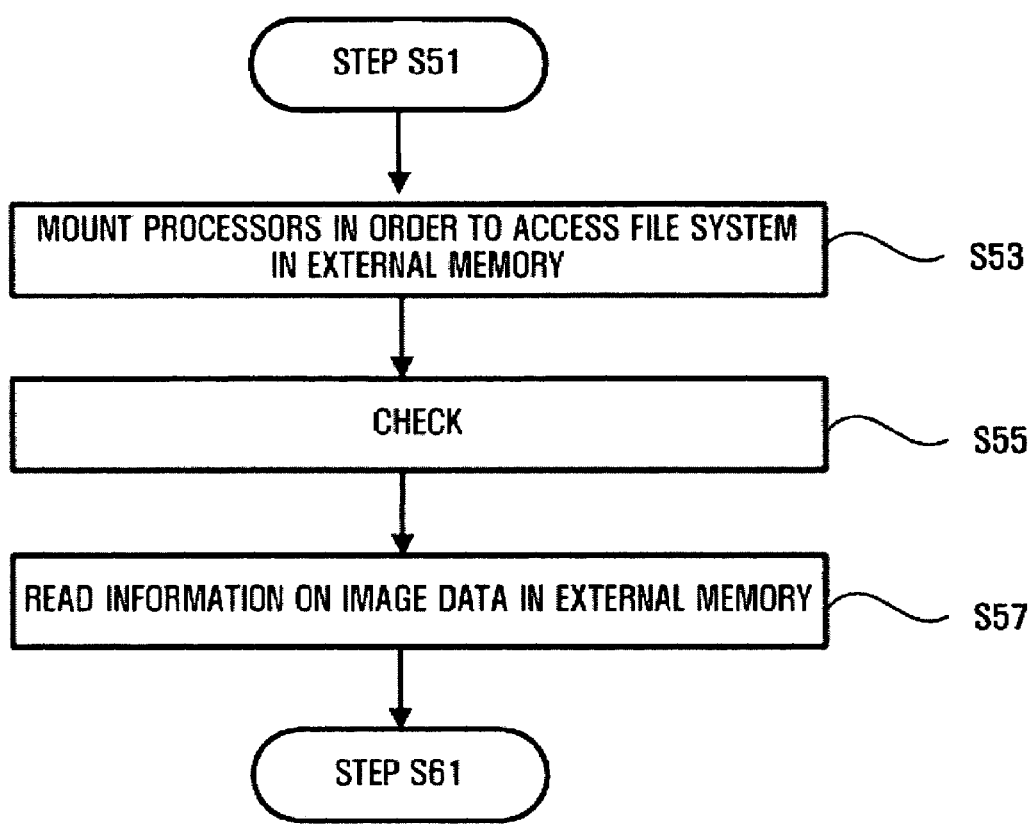
FIG. 2 is a flow chart illustrating an initialization process of the external memory in FIG. 1.

If the internal memory is unavailable, the external memory is initialized S413 as described with reference to FIG. 2.

In addition, after the completion of the external memory initialization, images are captured, DCF information (list) is renewed, and the captured image data are stored in the external memory S415 and S417. The internal memory is unavailable when an error occurred therein or there is not sufficient free space.

When the internal memory is available, an additional background process is loaded via a process-driving unit 320 S421. The background process executes the external memory initialization as a background operation. The detailed information will be described with reference to FIG. 5.

When the user shoots images, image data is encoded in jpg by a JPEG chipset and stored via a storage unit 340 S431 and S441. The storage unit 340 may be a RAM or a flash memory, the stored image data is named based on DCF and stored in the internal memory (the RAM or flash memory). Once the external memory has been initialized, a file may be named.

For example, if a storage folder storing image data is "100SSCAM" and the name of the image data is "SSL1001", the file can be named with an increment of 1 such as "SSL1002", "SSL1003". As described above, the file can be named based on the DCF.

After storing the image data in the internal memory, the control unit 310 determines whether the external memory has been initialized S451.

If the external memory initialization is in progress, it is determined whether the internal memory is available for taking additional shots. If the additional shots can be taken, the images continue to be captured. Otherwise, a message saying that images can no longer be captured is output and waits until the external memory has been completely initialized S452 and S453.

If the external memory has been completely initialized, the image data stored in the internal memory is saved (backed up) via the storage unit 340 and the DCF information is renewed S461 and S471. In another exemplary embodiment, the DCF information may be renewed as a background operation via the background process.

The DCF information is renewed when image data temporarily stored in the internal memory is stored in the external memory or directly stored in the external memory without using the internal memory. When the image data is stored in the internal memory, it is checked whether the DCF should be renewed as the image data is backed up (stored).

The image data is managed as DCF information when the data stored in the internal memory is stored in the external memory. The image data is named or information renewal on thumbnails and screen nails is executed via DCF information renewal. Here, the screen nail is the image data which has been resized to fit the current screen in order to output the captured image on the screen, and the thumbnail is the image data that may be viewed in window-based an image viewer.

Conversely, if the external memory has been completely initialized but there is not an enough available space in the external memory, and thus, the image data cannot be stored, the user can opt to continue to shoot and store data using the available space in the internal memory as long as there is enough available space therein. In addition, the data stored in the internal memory can be stored in the external memory once a new external memory has been put in place of the old one. These steps may be sequentially or concurrently executed, and be in a different order according to the exemplary embodiment.

Figure 5:
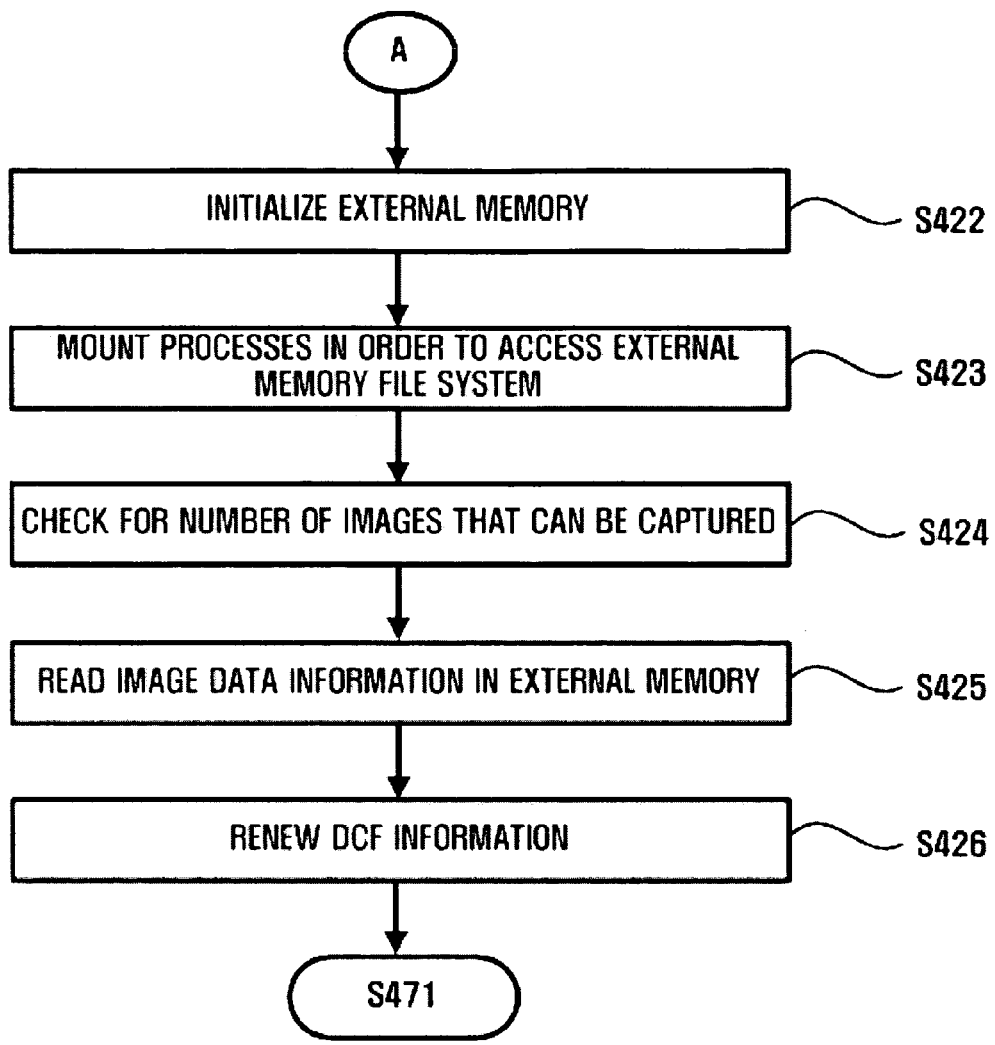
FIG. 5 is a flow chart illustrating an initialization process of an external memory via a background process according to an exemplary embodiment of the present invention.

FIG. 5 is a flow chart illustrating an initialization process of an external memory via a background process according to an exemplary embodiment of the present invention.

The initialization of the external memory may be executed as a background operation via the back ground processor.

First, a mounting process is executed in order to access to a file system in the external memory S422 and S423.

In addition, an available space in the external memory and the number of images that can be stored therein is determined S424.

Next, when storing the captured image data, information on existing image data stored in the external memory is read S425 in order to name the data. In this case, the data can be named based on DCF and may be managed using the DCF information.

Then, once the external memory has been completely initialized, the background process renews the DCF information S426. In this case, the renewal of DCF information is not processed via the background process but may be processed via step S461 of FIG. 4 in another exemplary embodiment. The aforementioned steps may be sequentially or concurrently executed, and be in a different order according to the exemplary embodiment.

Figure 6:
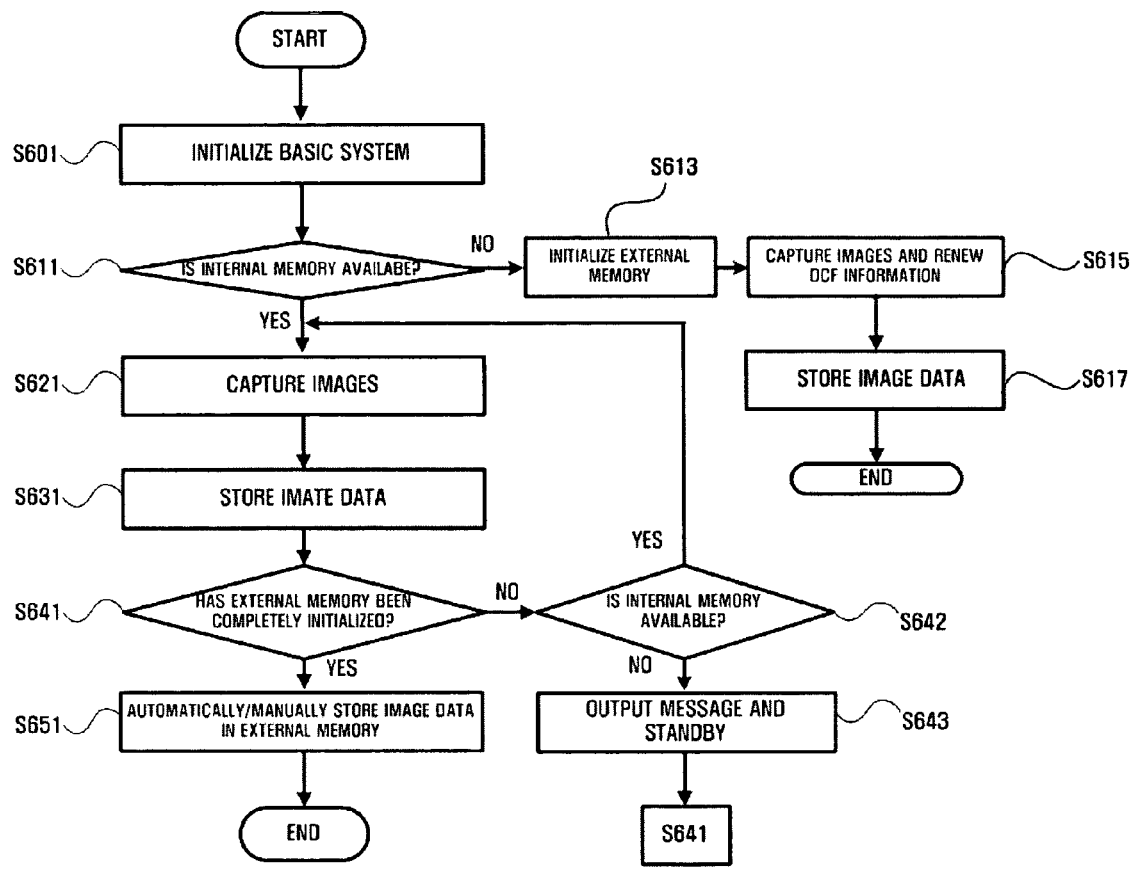
FIG. 6 is a flow chart illustrating a shooting process of a camera.

FIG. 6 is a flow chart illustrating a shooting process of a camera.

FIG. 6 describes if an external memory in a specific system cannot possibly be initialized as a background operation, an image can be captured using an internal memory and then the external memory is initialized. Some of the descriptions that overlap with FIG. 4 will be omitted.

When a system is cold booted, a digital camera executes a basic system initialization S601.

Once the basic initialization has been completed, it is determined by a control unit 310 whether an internal memory (e.g., a RAM or a flash memory) is available for use S611.

In this case, if a user sets a specific internal memory (e.g., RAM), captured images can be stored by using the set internal memory but if the user does not set a specific internal memory, it is determined by the control unit 310 whether a RAM or a flash memory is available for use. Then, the images are stored by selecting the available internal memory.

If the internal memory is not available for use, the external memory is initialized S613 as described above with reference to FIG. 2.

Once the external memory has been completely initialized, images are captured, DCF information (list) is renewed, and the captured images are stored in the external memory S615 and S617. The internal memory is unavailable when an error occurs therein, or there is insufficient free space.

When the internal memory is available for use, images are captured using the internal memory, encoded in the jpg format by a JPEG chipset, and stored in a storage unit 340 S621 and S631.

The image data is stored in the internal memory, and it is determined by the control unit 310 whether the external memory has been completely initialized S641.

If the external memory initialization is still in progress, it is determined whether the internal memory is available for taking additional shots. If so, the images continue to be captured. Otherwise, a message saying that images can no longer be captured is output and waits until the external memory has been completely initialized S642 and S643.

Once the external memory has been completely initialized, the image data stored in the internal memory is stored (backed up) in the external memory via the storage unit 340 S651. In this case, the user can choose whether to choose the image data in the external memory automatically or manually. When the image data is stored, the external memory renews the DCF information. The aforementioned steps may be sequentially or concurrently executed in a different order according to the exemplary embodiment.

As described above, according to the present invention, the following effects will be anticipated.

First, a camera can be put into immediate use by using an internal memory.

Second, time required for an initialization can be reduced by executing the initialization as a background operation.

The exemplary embodiments of the present invention have been explained with reference to the accompanying drawings, but it will be apparent to those skilled in the art that various modifications and changes may be made thereto without departing from the scope and spirit of the invention. That is, a digital device that stores the broadcasting content has been described as an example of a filtering interface according to exemplary embodiments of the present invention. However, the filtering interface provision method may be applied when a menu is filtered according to user preferences and displayed in digital devices storing digital content such as computers, PDAs, PMPs, mobile phones, and digital broadcasting receivers. Therefore, it should be understood that the above exemplary embodiments are not restrictive but illustrative in all aspects.

What is claimed is:

1. An apparatus for capturing images, the apparatus comprising:
   a control unit that determines whether an internal memory is available for immediate use to store images captured by the apparatus upon booting of the apparatus; and
   a process-driving unit that loads background processes which comprise a background process of executing initializing external memory as a background operation when the control unit determines that the internal memory is available,
   wherein the initializing of external memory is not performed as a background operation when the control unit determines that the internal memory is not available.

2. The apparatus of claim 1, wherein the internal memory comprises at least one of a RAM and a flash memory and the control unit determines whether the internal memory is available for use when capturing images, selects the available internal memory, and stores image data.

3. The apparatus of claim 2, further comprising a renewal unit that renews design rule for camera file system (DCF) information when the image data stored in the internal memory is stored in an external memory.

4. The apparatus of claim 3, wherein the image data stored in the external memory is named based on the DCF format.

5. The apparatus of claim 3, wherein the external memory initialization comprises at least one of mounting processes in order to access to the external memory file system and renewing the DCF information.

6. A method for capturing images, the method comprising:
   determining whether an internal memory is available for immediate use upon beginning to capture images; and
   loading background processes when the internal memory is available, comprising a background process which executes initializing external memory as a background operation when the control unit determines that the internal memory is available,
   wherein the initializing of external memory is not performed as a background operation when the control unit determines that the internal memory is not available.

7. The method of claim 6, wherein the internal memory comprises at least one of a RAM and a flash memory and a control unit determines whether the internal memory is available for use when capturing images, selects the available internal memory, and stores image data.

8. The method of claim 7, further comprising renewing design rule for camera file system (DCF) information when the image data stored in the internal memory is stored in an external memory.

9. The method of claim 8, wherein the image data stored in the external memory are named based on the DCF format.

10. The method of claim 8, wherein the external memory initialization comprises at least one of mounting processes in order to access to the external memory file system or renewing the DCF information.

* * * * *